Oct. 19, 1954  A. M. CROSWELL ET AL  2,692,159
LIFTING APPARATUS WITH DEFLECTION COMPENSATING UNIT
Filed June 11, 1952  2 Sheets-Sheet 1
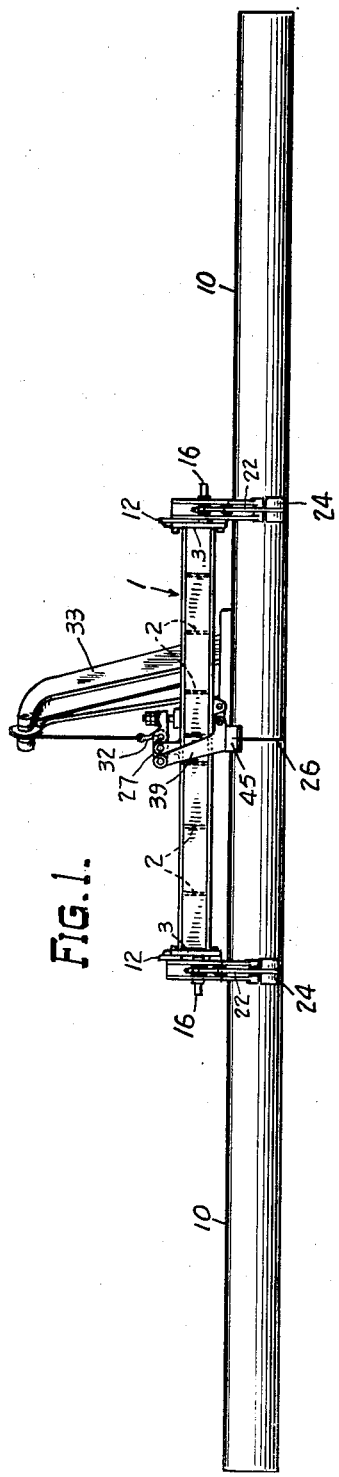
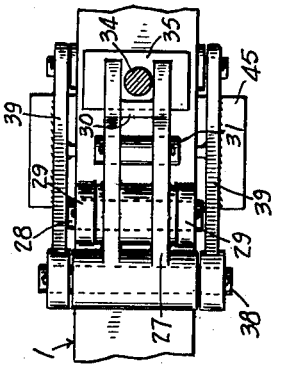
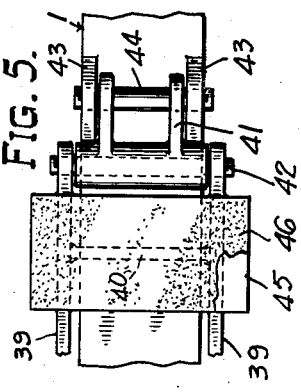
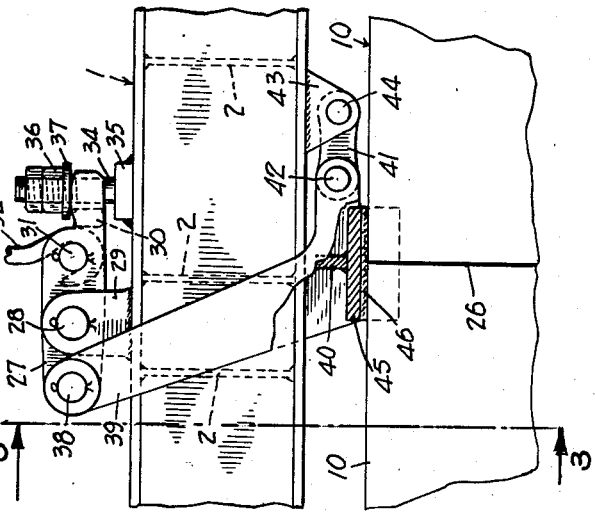
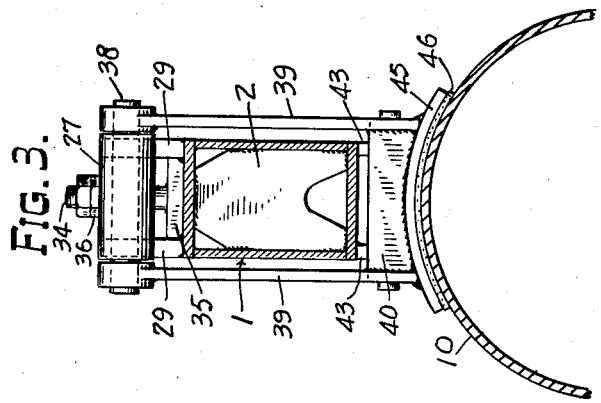
INVENTORS:
Althos M. Croswell
BY Bertil G. Winstrom
Andrus & Scales
ATTORNEYS.

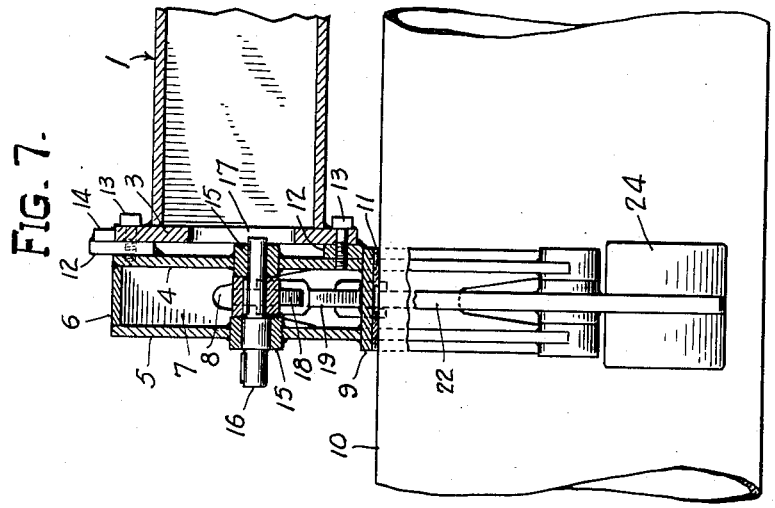
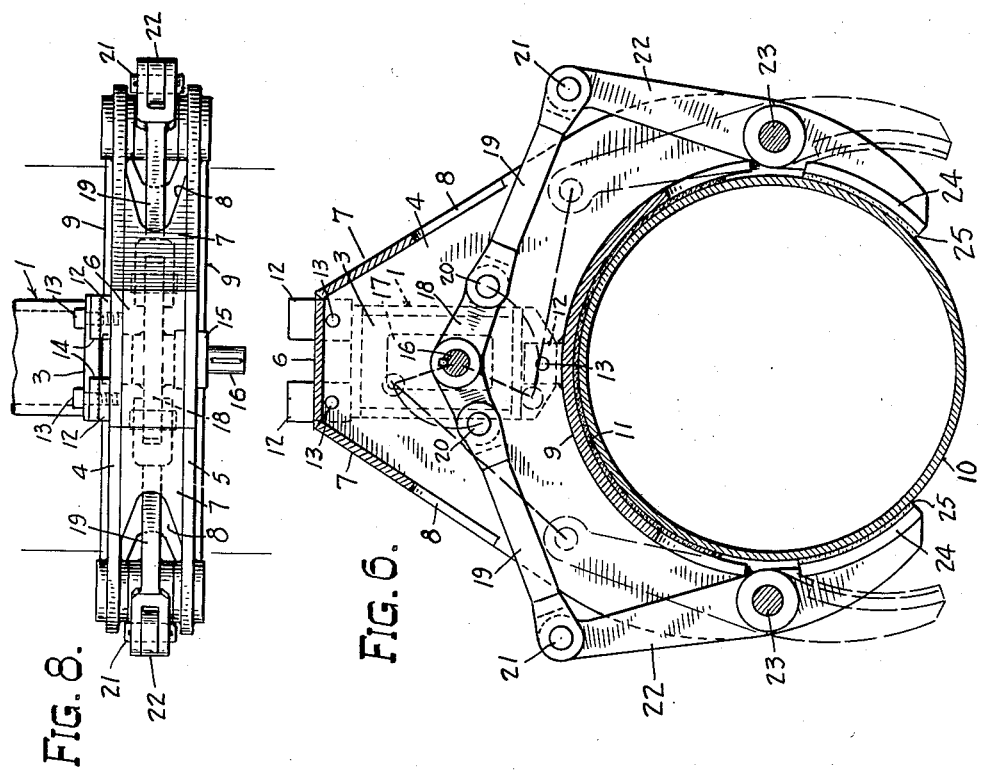

Patented Oct. 19, 1954

2,692,159

UNITED STATES PATENT OFFICE 2,692,159

LIFTING APPARATUS WITH DEFLECTION COMPENSATING UNIT

Althos M. Croswell, Shreveport, La., and Bertil G. Winstrom, Thiensville, Wis., assignors, by direct and mesne assignments, to A. O. Smith Corporation, Milwaukee, Wis., a corporation of New York Application June 11, 1952, Serial No. 292,812

9 Claims. (Cl. 294—81)

This invention relates to a lifting apparatus and more particularly to an apparatus designed to lift and move two tubular articles assembled end-to-end, and which apparatus has a deflection compensating unit that prevents relative movement between the articles or disalignment thereof during lifting.

One object of the present invention is to provide a compact inexpensive apparatus for lifting two metal articles or relatively long unattached pipe sections, which are aligned in an end-to-end manner, without tilting or otherwise disturbing the alignment thereof.

Another object of the invention is to provide a lifting apparatus that permits alignment of tubular sections on the ground before lifting and prevents breaking of the joint formed by alignment of the members.

A further object of the invention is to provide a lifting apparatus which permits alignment of pipe sections on the ground considerably ahead of the arrival of the welding machine.

In the laying of pipe line two, or perhaps more, pipe sections having a length of about 40 feet are initially welded together to form a stringer, and this stringer is then welded to the pipe line itself. The welding of the pipe sections to form a stringer may be accomplished by some form of automatic welding in order to speed up the welding operation and hence increase the speed of laying.

If pipe sections to be welded are lifted separately onto a welding machine, aligned in an end-to-end relation and fitted with an internal line-up clamp which is disposed within the pipe sections behind the joint therebetween the handling, aligning and fitting requires considerable time during which the welding machine is idle and welding production is curtailed. The term "joint" as used herein refers to the meeting of the unconnected abutting or opposing ends of the aligned pipe sections after assembly and prior to welding of the ends together unless otherwise specified.

To remedy this situation it has been found that if the pipe sections are aligned on the ground, fitted with an internal welding clamp then lifted in this aligned relation onto the welding machine, a greater period of welding can be obtained from the machine for a given time. The present invention is therefore directed to an apparatus designed to lift the unattached aligned pipe sections from the ground onto a welding machine without disturbing the alignment or the fitting of the internal clamp. As no time need be given to the alignment or fitting operations while the pipe sections are in the machine, since the pipe sections are assembled and aligned in advance of the welding machine, the aligned pipe may be immediately welded when laid in the welding machine. This results in considerable saving of time and labor.

According to the present invention the lifting apparatus in general comprises a horizontally disposed beam having a toggle clamp or the like suspended from each end thereof. Each clamp is adapted to grasp one of the aligned pipe sections at a circumferential line between the center of mass of the pipe and the joint between pipe sections.

A deflection compensating unit is associated with the beam and serves to prevent disalignment of the pipe sections at the joint therebetween as the same are lifted from the ground onto the welding machine. The unit includes an arcuate shoe which is disposed beneath the beam and adapted to lie across the joint between the pipe sections. A pivoted linkage is associated with the beam and interconnects the shoe and the beam with a suitable lifting unit. The point of attachment of the lifting unit to the linkage is vertically aligned with the shoe and the pipe joint.

As the lifting unit moves upwardly, the linkage is pivoted downwardly causing the shoe to bear against the pipe joint. Additional upward movement of the lifting unit will lift the beam and the attached pipe sections, which are gripped by the toggle clamps, with the shoe remaining in firm bearing contact with the pipes at the joint therebetween to prevent disalignment or relative movement of the pipe sections during the lifting operation.

Other objects and advantages will appear in the course of the following description.

In the drawings:

Figure 1 is a side elevation view of the lifting apparatus engaging two aligned pipe sections;

Fig. 2 is an enlarged fragmentary view of Figure 1 with part broken away and sectioned;

Fig. 3 is a transverse sectional view taken along line 3—3 of Fig. 2;

Fig. 4 is a top plan view of Fig. 2 with the lifting hook being omitted;

Fig. 5 is a bottom view of Fig. 2;

Fig. 6 is a vertical section of the pipe clamping mechanism;

Fig. 7 is an end elevation of the pipe clamping mechanism with a part broken away in section; and Fig. 8 is a top plan view of the pipe clamping mechanism.

Referring to the drawings there is shown an apparatus for lifting two end aligned articles which is particularly adapted for lifting two end-to-end aligned pipe sections.

The apparatus shown comprises a generally rectangular box-shaped supporting member or beam 1 internally reinforced throughout its length by a plurality of transverse web plates 2 welded edgewise to the inner surfaces of the beam.

A generally rectangular end plate 3 is welded flatwise to each end of beam 1 to close the beam. Each plate 3 extends upwardly beyond the upper surface of the beam and the lower edge and extends downwardly beyond the lower surface of the beam.

A toggle clamp assembly is attached to the end of each end plate 3 and comprises a pair of axially spaced generally C-shaped plates 4 and 5 having the open side thereof facing downwardly and connected at their top extremities by a top plate 6 and a pair of bracing plates 7 which are disposed across the tapered edges of the plates 4 and 5 approaching top plate 6. Plates 7 are each provided with a generally V-shaped notch 8 through which the toggle members move during operation of the clamping assembly.

The bottom edges of the C-shaped plates 4 and 5 are connected by an arcuate shoe 9 having a curvature in general conformity with the pipe sections 10 to be lifted. Shoe 9 carries a friction pad 11 or lining material on the lower surface thereof which is adapted to be in contact with pipe sections 10.

The inner plate 4 of each clamping assembly is spaced from the adjacent end plate 3 of beam 1 by a plurality of spacer blocks 12. A pair of the blocks 12 are welded to the upper edge portion of inner plate 4 and project upwardly therefrom, and a single block 12 is welded to the lower edge portion of plate 4 and to shoe 9. A plurality of bolts 13 extend through aligned openings in plate 4, blocks 12 and end plate 3 and in cooperation with their nuts, which engage plate 3, secure the toggle clamp assembly to each end of beam 1.

A supporting block 14 is attached to the upper portion of each block 12 adjacent the upper surface of plate 4 and rest on the upper edge of end plate 3 to aid in supporting the respective clamping assemblies.

Plates 4 and 5 are provided with aligned openings which receive bearings 15. A shaft 16 is journaled within bearings 15 and the inner end of shaft 16 extends within a central opening 17 formed in end plate 3.

Toggle arms 18 are disposed between plates 4 and 5, and their common hub is keyed to shaft 16. The inner end of each of a pair of toggle links 19 is pivotally attached to its respective toggle arm 18 by a pin 20 while the outer end of each toggle link 19 is pivotally connected by a pin 21 to the upper longer arm of a clamping lever 22.

Each clamping lever 22 is fulcrumed about a shaft 23 which is suitably secured in bearings welded to the lower ends of plates 4 and 5 and to the lower edge of shoe 9.

The lower arm of each clamping lever 22 carries a generally curved clamping jaw 24 faced with a friction pad 25.

The outer end of shaft 16 serves as a connection, to which a suitable crank handle or the like, not shown, may be attached to rotate shaft 16 and pivot the clamping levers 22.

As shaft 16 is manually rotated, the attached toggle arms 18 correspondingly rotate causing toggle links 19 to move inwardly as shown in Fig. 6. The inward movement of links 19 pivots levers 22 about the respective shafts 23 and opens the clamping jaws 24. Conversely, a manual rotation of shaft 16 in the opposite direction will close jaws 24.

Beam 1 for convenience of transportation and handling is constructed of a length substantially less than that of either of the usually long pipe sections 10 to be lifted, therefore a compensating device is employed to prevent tilting or other relative movement of the pipe sections 10 at the joint 26 therebetween during lifting of the sections.

The compensating device is associated with beam 1 and comprisees a lever 27 disposed above and longitudinally of beam 1. Lever 27 is pivotally secured by pin 28 between a pair of upstanding lugs 29 attached to the upper surface of beam 1 and is comprised of a long and a short arm. The long arm of lever 27 is bifurcated and is connected near its outer end by cross bar 30.

A supporting pin 31 is disposed within aligned openings in the long arm of lever 27 and a hook 32, suspended from a suitable lifting unit, such as a crane, block and tackle or the like which is shown schematically and indicated generally by 33, is adapted to engage the pin 31 between the bifurcated arms of lever 27. Pin 31 is positioned directly above the joint 26 between pipe sections 10 so that any upward movement of crane 33 will be transmitted in the plane extending through pipe joint 26 and tend to stabilize the lifting operation.

The bifurcated end of lever 27 straddles a vertically disposed stud 34, the lower extremity of which is suitably secured to a bar 35 which is welded to the upper surface of beam 1. The upper extremity of stud 34 is threadedly engaged by an adjustable stop nut 36 with a washer 37 thereunder. The bifurcated end of lever 27 is adapted to engage washer 37 which during pivotal movement of lever 27 about pin 29 strikes stop nut 36. By thtreaded adjustment of nut 36 the magnitude of pivotal movement of lever 27 may be varied.

The short arm of lever 27 is suitably journaled on a pin 38, secured in the upper ends of a pair of arms 39. Arms 39 extend diagonally downward from pin 38 on either side of beam 1 and the arms are connected at the lower extremities by a cross plate 40 which is welded edgewise to arms 39.

The lower portion of each arm 39 is provided with an angularly disposed ear which is pivotally attached to one end of a link 41 by pin 42. The other end of link 41 lies between spaced lugs 43, which are secured to the bottom of beam 1 and the link is pivotally attached to the lugs by a pin 44.

A bar means shown as a generally arcuate shoe 45 is welded to the lower edges of arms 39 and cross plate 40 and carries a friction pad 46 which is adapted to bear against pipe sections 10 at the upper portion of joint 26 during lifting of the pipe. Both shoe 45 and pad 46 are vertically aligned with supporting pin 31 and extend for approximately equal distances on either side of pipe joint 26.

As hook 32, which is engaged with pin 31, moves upwardly through the initial lifting action of crane 33, lever 27 is pivoted counterclockwise about pin 28, causing arms 39 to move downwardly and force shoe 45 with the attached pad 46 into bearing with pipe sections 10. Link 41 causes shoe 45 to move vertically as lever arms 39 are pivoted and maintain alignment with the center line of the pipe joint 26. Continued upward movement of hook 32 causes the bifurcated end of lever 27 with washer 37 to be pivoted into contact with nut 36 thereby stopping the pivotal movement of the lever. Continued upward movement of crane 33 will then raise beam 1 and pipe sections 10.

To begin operation the pipe sections 10 to be welded are first aligned in an end-to-end relation on the ground and a suitable internal welding clamp, not shown, may be inserted within the pipe sections behind the joint 36 between the sections. Hook 32 is in engagement with pin 31, to provide a connection between beam 1 and the crane 33, and clamping jaws 24 are in the extended or open position.

Beam 1 is then lowered toward the aligned pipe sections 10 by crane 33 until shoe 9 of each clamp comes into contacting relation with its respective pipe section 10.

Clamping jaws 24 are next closed about the pipe sections 10 by manually rotating pivot shaft 16 by a crank or the like. After the pipe sections are firmly grasped by jaws 24 the crane 33 is elevated. The initial upward movement of crane 33 instead of lifting beam 1 merely pivots lever 27 counterclockwise and causes arms 39 to move downwardly to force shoe 45 into contact with the pipe joint 26.

When lever 27 strikes stop nut 36 the pivotal movement of the lever is stopped with the result that continued upward movement of crane 33 will then lift beam 1. However, as long as there is an upward force at pin 31 caused by the lifting or suspension of beam 1 by crane 33, shoe 45 will bear firmly against the pipe sections at pipe joint 26 and prevent tilting or other disalignment of pipe sections 10 while the same are suspended from crane 33.

The aligned pipe sections 10 are then deposited by crane 33 onto the welding machine in preparation for welding the pipe joint 26. As the pipe sections 10 come to rest in the welding machine, lever 27 is pivoted clockwise about pin 29 releasing the pressure of shoe 45 against the pipe joint 26.

The clamping jaws 24 are then manually retracted to release pipe sections 10, and beam 1 is then elevated by crane 33 to remove the same from the vicinity of welding.

The apparatus of the invention permits alignment and assembly of pipe sections on the ground ahead of the pipe welding machine. When the aligned sections are lifted from the ground onto the welding machine the compensating device of the invention insures that the joint between the assembled pipe sections will not be broken or disaligned. The invention is also applicable in the lifting of other tubular articles and flat plates which are to be welded together along abutting edges or to be lifted from one place to another with edge portions thereof maintained in alignment during the lifting operation.

Various embodiments of the invention may be employed within the scope of the accompanying claims.

We claim:

1. Apparatus for lifting a plurality of articles assembled end-to-end with the joint formed between the articles being subject to separation upon lifting of the articles, which comprises a supporting member extending on either side of the joint of the assembled articles in spaced relation thereto, means to raise said supporting member, clamping means secured to said supporting member and adapted to engage each of said articles and lift the articles when the supporting member is raised, and bar means secured to said supporting member and adapted to engage the upper surface of the assembled articles across said joint to prevent relative movement between the articles when the articles are lifted.

2. Apparatus for lifting a plurality of articles assembled end-to-end with the joint formed between the articles being subject to separation upon lifting of the articles, which comprises a supporting member extending on either side of the joint of the assembled articles in spaced relation thereto, clamping means secured to said supporting member and adapted to engage each of said articles and lift the articles when the supporting member is raised, bar means extending from the supporting member and across the joint between the articles, pivotal means connecting the bar means to said supporting member, and lifting means connected to said pivotal means to raise the supporting member and pivot the bar means into tight fitting engagement with the articles being lifted for preventing relative movement therebetween.

3. Apparatus for lifting and moving two independent tubular articles assembled end-to-end with the joint formed between the articles being subject to separation upon lifting of the articles, which comprises a supporting member extending across said joint, clamping means secured to said member above each article and adapted to separately grasp each of the articles at a line between the center of mass of each respective article and the joint between said articles preparatory to lifting the same, means to lift said member to raise said articles, and shoe means associated with said member and adapted to contact the upper surface of the articles on each side of said joint to prevent relative movement of the articles as the same are raised.

4. Apparatus for lifting and moving two independent tubular articles disposed end-to-end with a joint therebetween subject to separation upon lifting of the articles, which comprises a supporting member extending across said joint, clamping means on said member adapted to grasp each of the articles for lifting the same, lifting means for lifting said member and raising the articles, and shoe means pivotally connected to said lifting means and adapted to move into contact with the articles on each side of said joint upon the initial upward movement of said lifting means and to bear against said articles to prevent relative movement of the articles at the joint during continued upward movement of said lifting means.

5. Apparatus for lifting and moving two independent tubular articles disposed end-to-end with the joint therebetween subject to separation upon lifting of the articles, which comprises a supporting member extending across said joint, clamping means on said member adapted to grasp each of the articles for lifting the same, lifting means for lifting said member and raising the articles, shoe means associated with said member, and means pivotally interconnecting said lifting means and said shoe means to move the shoe means into contact with the articles on each side of said joint upon the initial movement of said lifting means and thereafter to bear against said articles as the articles are raised by continued movement of said lifting means and thereby prevent relative movement of said articles.

6. Apparatus for lifting two independent pipe sections aligned in an end-to-end relation with the joint formed between the sections being subject to separation upon lifting of the sections, which comprises a beam disposed above and longitudinally of the aligned pipe sections, clamping means secured to said beam and adapted to grasp each pipe section at a line between the center of mass of each pipe section and the joint between said sections, lifting means adapted to lift said beam to elevate the pipe sections, shoe means contacting the pipe sections on each side of the joint between said sections as the pipe sections are elevated to prevent disalignment thereof, and pivotal means secured to said beam and interconnecting the lifting means and the shoe means, said pivotal means being connected to said lifting means at a line in substantial vertical alignment with the joint between the pipe sections and pivoting said shoe means into contact with the pipe sections at said joint upon the initial upward movement of said lifting means.

7. Apparatus for lifting two independent pipe sections aligned in an end-to-end relation with the joint formed between the sections being subject to separation upon lifting of the sections, which comprises a supporting member disposed above the aligned pipe sections and across the joint therebetween, clamping means secured to said member and adapted to grasp each pipe section at a line between the center of mass of each pipe section and the joint between said sections, lifting means for lifting said member to elevate the pipe sections, shoe means contacting the pipe sections on each side of the joint between said sections as the pipe sections are elevated to prevent disalignment thereof, and pivotal means associated with said member and interconnecting the lifting means and said shoe means, said pivotal means being adapted to be pivoted by said lifting means as the lifting means is actuated upwardly to force said shoe means into contact with the pipe sections on either side of said joint, and means limiting the pivotal movement of said pivotal means to effect continued upward movement of said lifting means to lift said member and elevate the pipe sections.

8. Apparatus for lifting two independent pipe sections aligned in an end-to-end relation with the joint formed between the sections being subject to separation upon lifting of the sections, which comprises a beam disposed above and longitudinally of the aligned pipe sections, clamping means secured to said beam and adapted to grasp each pipe section at a line between the center of mass of each pipe section and the joint between said sections, lever means pivoted to the upper surface of said beam, lifting means connected to said lever means at a line in substantial vertical alignment with the joint between the pipe sections for lifting said beam, shoe means disposed beneath said beam for contacting the upper portion of the pipe sections on either side of the joint between said sections, means interconnecting said lever means to said shoe means to move the shoe means into contact with the pipe sections at said joint as said lever means is pivoted by the initial upward movement of said lifting means, and means associated with said beam for limiting the pivotal movement of said lever means and effecting continued upward movement of said lifting means to lift said beam and elevate said pipe sections.

9. Apparatus for lifting two independent articles assembled end-to-end with the joint formed between the articles being subject to separation upon lifting of the articles, which comprises a beam member extending across the joint between the articles, means to lift said beam, a clamp secured to each of the opposite end portions of the beam above each article with each clamp being adapted to engage the article with which it is assembled preparatory to lifting the article, a lever pivoted to the top of the beam member between said clamps, a pair of arms secured to one end of the lever and extending downwardly on each side of the beam, a link pivoting the lower end portion of each arm to the lower end of said beam, a shoe member secured to the lower end of each arm and extending across the joint between the articles, means on said lever for engagement by said lifting means for pivoting the lever to raise one end of the lever upwardly and pivot the other end of the lever downwardly to move the arms downwardly and force the shoe into clamping engagement with the articles at said joint to prevent breaking of the joint when the articles are lifted, and a stop secured to the top of the beam and engaged by the end of the lever opposite the end to which the arms are attached to limit the pivotal movement of the lever and effect lifting of the beam and articles as the lifting means is applied to said lever.

No references cited.